(12) United States Patent
Kurz

(10) Patent No.: US 6,513,988 B2
(45) Date of Patent: Feb. 4, 2003

(54) BEARING DEVICE FOR A THREADED SPINDLE OF A MACHINE TOOL

(75) Inventor: Artur Kurz, Wendlingen (DE)

(73) Assignee: Gebr. Heller Maschinenfabrik GmbH, Nürtingen (DE)

( * ) Notice: Subject to any disclaimer, the term of this patent is extended or adjusted under 35 U.S.C. 154(b) by 0 days.

(21) Appl. No.: 09/802,059

(22) Filed: Mar. 7, 2001

(65) Prior Publication Data

US 2001/0021286 A1 Sep. 13, 2001

(30) Foreign Application Priority Data

Mar. 7, 2000 (DE) .......................... 100 10 901

(51) Int. Cl.⁷ ........................... F16C 19/10; F16C 19/30
(52) U.S. Cl. ..................... 384/605; 384/905; 409/231
(58) Field of Search .......................... 384/905, 605, 384/557, 493; 409/231

(56) References Cited

U.S. PATENT DOCUMENTS

| | | | | |
|---|---|---|---|---|
| 3,034,408 A | * | 5/1962 | Kampmeier | 279/4.03 |
| 3,580,135 A | * | 5/1971 | Jones | 409/231 |
| 3,869,002 A | * | 3/1975 | Koenig, III | 173/166 |
| 3,945,694 A | * | 3/1976 | Vaillette | 384/493 |
| 4,329,000 A | * | 5/1982 | Keske | 384/464 |
| 4,514,123 A | * | 4/1985 | Johnstone et al. | 184/6.1 |
| 4,746,230 A | * | 5/1988 | Jensen | 384/311 |
| 4,828,437 A | * | 5/1989 | Mukherjee et al. | 269/20 |
| 4,884,903 A | * | 12/1989 | Pham et al. | 384/467 |
| 5,137,400 A | * | 8/1992 | Sagara et al. | 384/29 |
| 5,302,062 A | * | 4/1994 | Baba et al. | 279/4.09 |
| 5,382,096 A | * | 1/1995 | Stein et al. | 384/100 |
| 5,388,917 A | * | 2/1995 | Hibi et al. | 384/493 |
| 6,120,186 A | * | 9/2000 | Snellman | 384/151 |
| 6,158,895 A | * | 12/2000 | Date | 384/493 |

FOREIGN PATENT DOCUMENTS

| | | | | |
|---|---|---|---|---|
| GB | 2111136 | * | 6/1983 | 384/493 |
| JP | 3234916 | * | 10/1991 | 384/493 |

* cited by examiner

Primary Examiner—Christopher P. Schwartz
Assistant Examiner—Devon Kramer
(74) Attorney, Agent, or Firm—Gudrun E. Huckett

(57) ABSTRACT

A bearing device for a threaded spindle has a bearing housing with at least one receptacle configured to receive a bearing part of the threaded spindle. The at least one receptacle is a clamping bushing securing the bearing part by electromechanical elements or fluid-operated elements. The clamping bushing has a wall that is elastically deformable by a pressure medium. The wall and the bearing housing define an annular chamber configured to receive the pressure medium. A control unit is provided to control the pressure of the pressure medium and thus the clamping action of the clamping bushing.

24 Claims, 2 Drawing Sheets

BEARING DEVICE FOR A THREADED SPINDLE OF A MACHINE TOOL

BACKGROUND OF THE INVENTION

1. Field of the Invention

The invention relates to a bearing device for a threaded spindle, in particular, of a machine-tool, comprising a bearing housing having at least one receptacle which receives a bearing part of the threaded spindle.

2. Description of the Related Art

Threaded spindles of machine tools are known which are received with their ends in bearing devices and on which, for example, carriages are movable which are seated with at least one rotatably driven threaded nut on the threaded spindle. Upon longer operation of the machine tool, the threaded spindle will heat up so that longitudinal extensions occur which result in an impermissibly high loading or even damage of the bearing device.

Therefore, one end of the spindles is received in a fixed or locating bearing and the other end is received in a floating or non-locating bearing. Further measures include mechanical (spring) or fluid-operated pretensioning devices. These bearing arrangements, however, reduce as a whole the stiffness of the spindle which results in a tendency to vibrate and in loss of precision. Moreover, the systems are cost-intensive and complex with regard to their configuration and reduce the permissible operational load of spindles and bearings by the amount of pretensioning.

SUMMARY OF THE INVENTION

It is an object of the present invention to provide a bearing device of the aforementioned kind with which damages as a result of longitudinal extensions of the threaded spindle can be reliably prevented and which, during operation, exhibit the physical conditions of a spindle secured or fixed on both ends.

In accordance with the present invention, this is achieved in that the receptacle for the bearing part of the threaded spindle is a clamping bushing which for clamping the bearing part of the threaded spindle can be loaded by electro-mechanical or fluid-operated elements.

In the bearing device according to the invention the bearing part of the threaded spindle is clamped by a clamping bushing. The clamping bushing is loaded by electro-mechanical elements or fluid-operated elements so that it secures the bearing part and thus the threaded spindle by a frictional connection in the axial direction. The pressure medium in the clamping bushing is relieved pursuant to a temporal sequence or according to signals of a measuring device for measuring length changes or tension changes. This cancels the frictional connection between the clamping bushing and the bearing part of the threaded spindle. The extension which is caused by heating of the threaded spindle can thus be compensated. As soon as this length compensation has taken place, the pressure medium of the clamping bushing is again pressurized so that the high frictional connection acting in the axial direction between the clamping bushing and the bearing part of the threaded spindle is reinstated.

DESCRIPTION OF THE PREFERRED EMBODIMENTS

Figure 1:
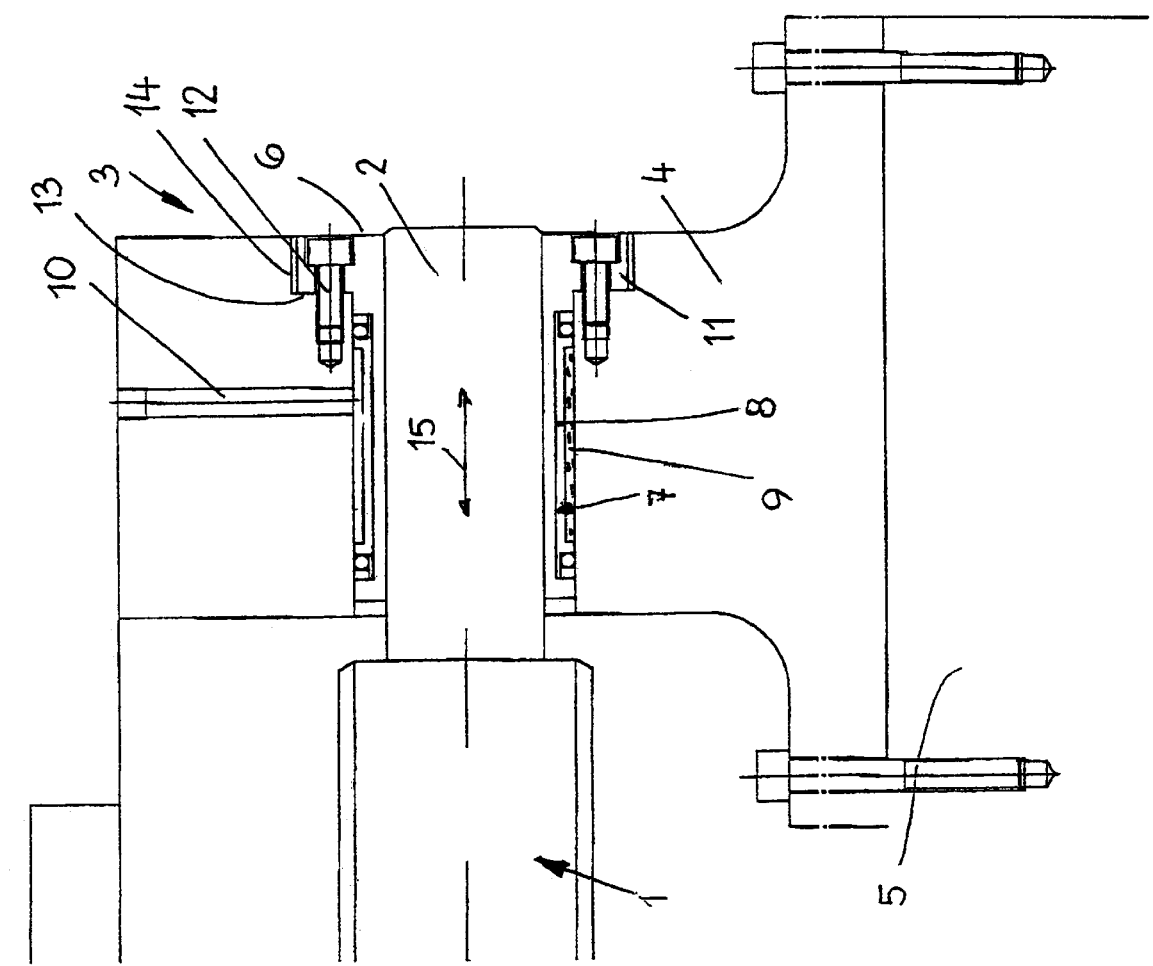
FIG. 1 is a schematic illustration of a first embodiment of a bearing device according to the invention for a threaded spindle.

The threaded spindle according to FIG. 1 is provided according to the disclosed embodiment on a machine tool and has a narrow or tapered end portion 2 with which the threaded spindle 1 is received in a bearing device 3. Advantageously, the other end of the threaded spindle 1, not illustrated in the drawing, is received in a bearing arrangement which is known from the prior art.

The two bearing devices, however, can also be of the same configuration. This results in the possibility of compensating the length changes partially by one bearing device and partially by the other bearing device and to thus divide the length changes symmetrically.

The bearing device 3 has a bearing housing 4 which is detachably connected, for example, on a machine table or machine frame 5. The bearing housing 4 has a receiving opening 6 in which a hydraulic clamping bushing 7 is arranged. It has a radially elastically deformable cylindrical wall 8 which surrounds the end portion 2 of the threaded spindle and which delimits radially inwardly an annular hydraulic chamber 9. The chamber is closed off at both ends and connected by a bore 10 with a hydraulic source (not illustrated). The bore 10 penetrates the bearing housing 4 radially and is provided at its radially outer end with a connector for a pressure medium supply line.

The hydraulic clamping bushing 7 is known in the art and is therefore only described briefly in this context. It has at one end a radially outwardly oriented flange 11 through which screws 12 or similar means are guided for attachment of the clamping bushing 7 in the bearing housing 4. The receiving opening 6 of the bearing housing 4 is widened at one end for receiving the clamping bushing flange 11. The flange 11 of the clamping bushing 7 in a mounted position rests on the bottom 13 of the widened receiving portion 14. The clamping bushing 7 is positioned seal-tight in the receiving opening 6. Advantageously, the flange 11 of the clamping bushing 7 is arranged countersunk in the widened receiving portion 14. The heads of the fastening screws 12 are also countersunk within the flange 11. The clamping bushing 7 can be easily mounted and also exchanged.

Initially, both ends of the threaded spindle 1 are clamped fixedly. On the threaded spindle 1 a carriage of the machine tool is moved by means of at least one rotatably driven spindle (not illustrated). When operated for an extended period of time, the threaded spindle 1 will heat up. The extension of the threaded spindle 1 as a result of heat generation results in high loading of the bearing device 3. In order to reduce the high loading, during functional operation of the machine the hydraulic chamber 9 is relieved during an unloaded phase of the spindle in certain time intervals or when reaching certain tensions so that the clamping of the end portion 2 of the threaded spindle 1 is released. The length changes of the spindle 1 caused by heat can be compensated by an axial movement of the threaded spindle 1 in the direction of the double arrow 15. After length compensation has occurred, the clamping bushing 7 is again loaded with hydraulic medium so that the end portion 2 is fixedly clamped.

The occurrence of length changes of the threaded spindle 1, respectively, of the end portions 2 can be measured with a fine measuring device. Such devices are well known in the art. This measuring device sends a signal to a control unit (not shown, but well known in the art) upon surpassing a preset length change which control unit then returns the hydraulic medium 9 of the clamping bushing 7 to the tank so that the length compensation of the threaded spindle 1 can be performed. Subsequently, the hydraulic medium is pressurized again by the control unit so that the clamping bushing 7 again clamps the end portion 2 of the threaded spindle 1.

Instead of using the longitudinal changes, it is also possible to provide the control signal based on tensile stress or compression strain.

The other end of the threaded spindle 1 which is not illustrated in FIG. 1 is secured in a fixed or locating bearing which can have any suitable configuration.

Figure 2:
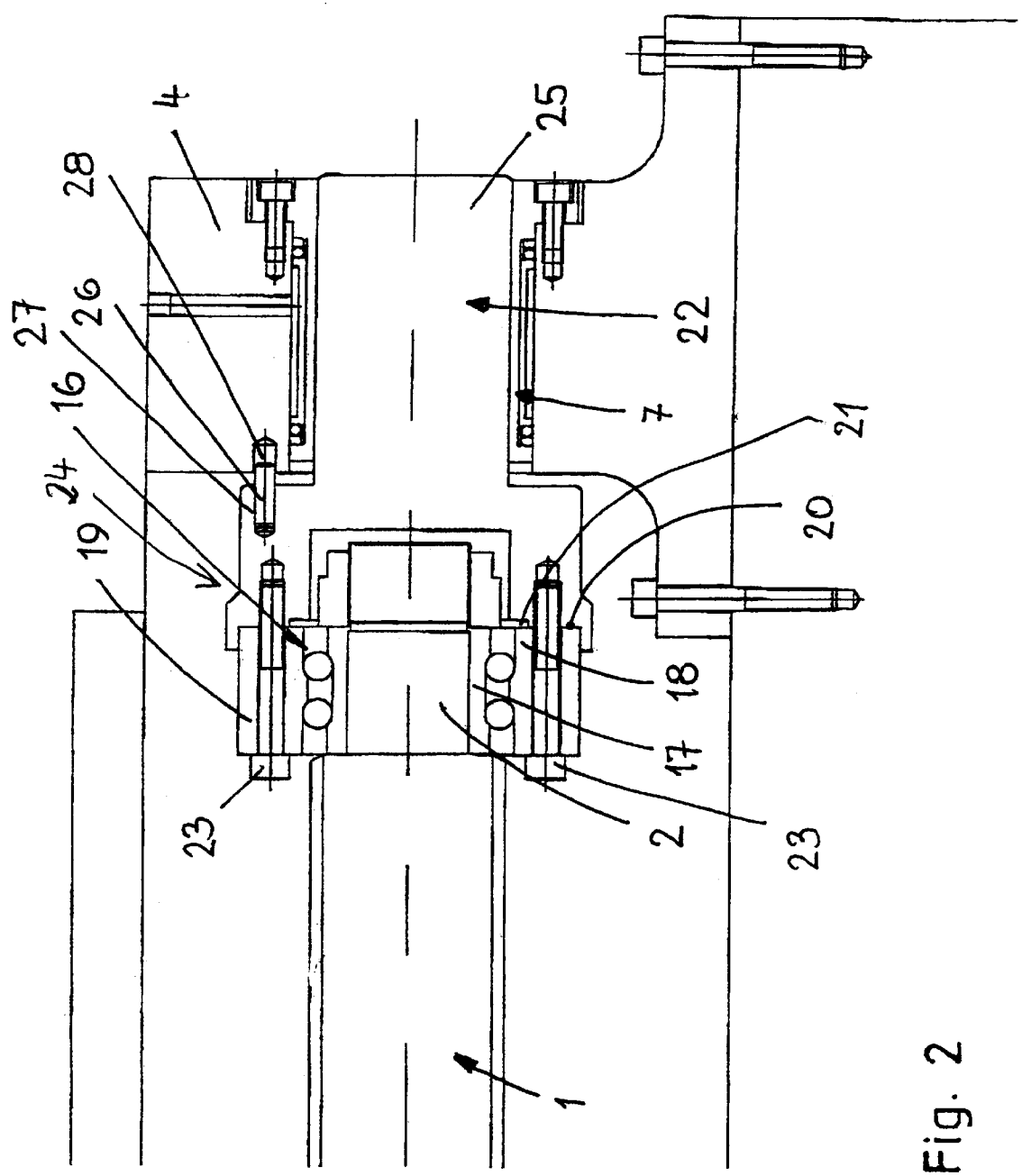
FIG. 2 shows an illustration corresponding to FIG. 1 of a second embodiment of the bearing device according to the invention.

FIG. 2 shows an embodiment in which the threaded spindle 1, in contrast to the previous embodiment, is rotatable about its axis. In order to enable this, between the stationary clamping bushing 7 and the threaded spindle 1 a radially and axially acting bearing 16, preferably a rolling bearing, is mounted. The end portion 2 of the threaded spindle 1 supports in this connection an inner ring 17 of the bearing 16 in a fixed connection for common rotation while the outer ring 18 is received in a flange or guide bushing 19. The flange or guide bushing 19 rests against a bottom 20 of an end-face depression 21 of the flange bolt 22 to which it is connected by means of screws 23. The depression 21 is provided in an end portion 24 of the flange bolt 22 having a larger outer diameter. A cylindrical bearing part 25 is provided adjoining the end portion 24. The bearing part 25 has a smaller outer diameter in comparison to the end portion 24 and is connected within the clamping bushing 7 either slidingly or fixedly. The flange bolt 22 is secured by at least one rotational securing device 26 against rotation. The rotational securing device in the shown embodiment comprises a pin projecting into an aligned blind bore opening 27, 28 in the end portion 24 of the flange bolt 22 and in the bearing housing 4. The end portion 24 has such an axial spacing from the bearing housing 4 and the blind bore opening 28 in the bearing housing is so deep that the threaded spindle 1 together with its bearing 16 can carry out the length compensation when the clamping bushing 7 is relieved in the manner described.

The described bearing device 3 which can be switched between fixed and floating bearing arrangement makes possible a simple, and particularly, inexpensive way of compensating the longitudinal changes resulting during operation of the threaded spindle 1 so that damage to the bearing device 3 and/or the threaded spindle 1 is reliably prevented and the physically advantageous conditions of a fixedly clamped spindle are present during operation of the machine.

While specific embodiments of the invention have been shown and described in detail to illustrate the inventive principles, it will be understood that the invention may be embodied otherwise without departing from such principles.

What is claimed is:

1. A bearing device (3) for a threaded spindle, said bearing device comprising:
a bearing housing (4) having at least one receptacle configured to receive a bearing part of the threaded spindle;
wherein said at least one receptacle is a clamping bushing (7) configured to secure said bearing part (2, 22) by electromechanical elements or fluid-operated elements;
wherein said clamping bushing (7) has a wall (8) configured to be elastically deformable by a pressure medium;
wherein said wall (8) and said bearing housing (4) define an annular chamber (9) configured to receive the pressure medium; and
a controlling unit configured to control a pressure of the pressure medium in said annular chamber (9) and to relieve said clamping bushing (7) in accordance with a temporal sequence to compensate length changes of the threaded spindle.

2. The bearing device (3) according to claim 1, wherein said bearing housing (4) has an opening (6) and wherein said clamping bushing (7) is inserted into said opening (6) of said bearing housing (4).

3. The bearing device (3) according to claim 2, wherein said clamping bushing (7) is detachably mounted in said opening (6) of said bearing housing (4).

4. The bearing device (3) according to claim 1, wherein said wall (8) is configured to rest against said bearing part (2, 22) under the force of the pressure medium.

5. The bearing device (3) according to claim 1, comprising at least one bore (10) connecting said annular chamber (9) to a pressure source.

6. The bearing device (3) according to claim 5, wherein said bore (10) penetrates said bearing housing (4).

7. A bearing device (3) for a threaded spindle, said bearing device comprising:
a bearing housing (4) having at least one receptacle configured to receive a bearing part of the threaded spindle;
wherein said at least one receptacle is a clamping bushing (7) configured to secure said bearing part (2, 22) by electromechanical elements or fluid-operated elements;
wherein said clamping bushing (7) has a wall (8) configured to be elastically deformable by a pressure medium;
wherein said wall (8) and said bearing housing (4) define an annular chamber (9) configured to receive the pressure medium;
a controlling unit configured to control a pressure of the pressure medium in said annular chamber (9);
a measuring device configured to measure length changes of the threaded spindle (1) resulting from temperature changes; and
wherein said measuring device is configured to send a signal to said control unit when a preset length change is surpassed, wherein the signal triggers relief of the pressure medium in said annular chamber (9).

8. The bearing device (3) according to claim 1, further comprising a radially and axially acting bearing (16) arranged in a flow of force from said clamping bushing (7) to the threaded spindle (1).

9. The bearing device (3) according to claim 8, wherein said radially and axially acting bearing (16) is a rolling bearing.

10. The bearing device (3) according to claim 8, wherein said bearing part is one end (2) of the threaded spindle (1).

11. The bearing device (3) according to claim 8, wherein said bearing part (22) is a flange bolt connected to said radially and axially acting bearing (16).

12. The bearing device (3) according to claim 11, further comprising a guide bushing (19) wherein said radially and axially acting bearing (16) is received in said guide bushing (19) and wherein said bearing part (22) is fixedly connected to said guide bushing (19) for common rotation.

13. The bearing device according to claim 8, wherein said bearing part (22) is connected to said bearing housing (4) so as to be axially moveable relative to said bearing housing (4) but fixedly fastened to said bearing housing (4) for common rotation.

14. The bearing device (3) according to claim 7, wherein said bearing housing (4) has an opening (6) and wherein said clamping bushing (7) is inserted into said opening (6) of said bearing housing (4).

15. The bearing device (3) according to claim 14, wherein said clamping bushing (7) is detachably mounted in said opening (6) of said bearing housing (4).

16. The bearing device (3) according to claim 7, wherein said wall (8) is configured to rest against said bearing part (2, 22) under the force of the pressure medium.

17. The bearing device (3) according to claim 7, comprising at least one bore (10) connecting said annular chamber (9) to a pressure source.

18. The bearing device (3) according to claim 17, wherein said bore (10) penetrates said bearing housing (4).

19. The bearing device (3) according to claim 7, further comprising a radially and axially acting bearing (16) arranged in a flow of force from said clamping bushing (7) to the threaded spindle (1).

20. The bearing device (3) according to claim 19, wherein said radially and axially acting bearing (16) is a rolling bearing.

21. The bearing device (3) according to claim 19, wherein said bearing part is one end (2) of the threaded spindle (1).

22. The bearing device (3) according to claim 19, wherein said bearing part (22) is a flange bolt connected to said radially and axially acting bearing (16).

23. The bearing device (3) according to claim 22, further comprising a guide bushing (19) wherein said radially and axially acting bearing (16) is received in said guide bushing (19) and wherein said bearing part (22) is fixedly connected to said guide bushing (19) for common rotation.

24. The bearing device according to claim 19, wherein said bearing part (22) is connected to said bearing housing (4) so as to be axially moveable relative to said bearing housing (4) but fixedly fastened to said bearing housing (4) for common rotation.

* * * * *